United States Patent [19]

Ogata et al.

[11] Patent Number: 4,960,189

[45] Date of Patent: Oct. 2, 1990

[54] SERPENTINE-SHAPED SPRAG RETAINER OF A SPRAG-SYNCHRONIZED ONE-WAY CLUTCH

[75] Inventors: Hirofumi Ogata, Chigasaki; Noboru Kitamura, Fujisawa, both of Japan

[73] Assignee: NSK-Warner Kabushiki Kaisha, Tokyo, Japan

[21] Appl. No.: 281,428

[22] Filed: Dec. 8, 1988

[30] Foreign Application Priority Data

Dec. 8, 1987 [JP] Japan .................. 62-186857[U]

[51] Int. Cl.$^5$ .............................................. F16D 41/07
[52] U.S. Cl. ................................. 192/41 A; 192/45.1
[58] Field of Search ............................ 192/41 A, 45.1; 188/82.8

[56] References Cited

U.S. PATENT DOCUMENTS

| | | | |
|---|---|---|---|
| 3,207,278 | 9/1965 | Titt ..................................... | 192/45.1 |
| 4,327,822 | 5/1982 | Vögele et al. .................... | 192/41 A |
| 4,360,093 | 11/1982 | Wakabayashi et al. .......... | 192/41 A |
| 4,373,620 | 2/1983 | Zlotek ............................... | 192/41 A |
| 4,522,289 | 6/1985 | Giese et al. ....................... | 192/45.1 |
| 4,809,831 | 3/1989 | Kinoshita .......................... | 192/41 A |

Primary Examiner—Leslie A. Braun
Assistant Examiner—Andrea Pitts
Attorney, Agent, or Firm—Skjerven, Morrill, MacPherson, Franklin & Friel

[57] ABSTRACT

A double retainer type sprag-synchronized one-way clutch assembly includes a plurality of sprags which are arranged in an annular space defined between an inner ring and an outer ring and a pair of inner and outer sprag retainers, which are generally ring-shaped, for retaining the plurality of sprags spaced apart from one another at a predetermined pitch. At least one of the inner and outer sprag retainers is fabricated from a plastic material or the like and includes a plurality of axial sections arranged circumferentially and a plurality of circumferential sections, each of which connects the corresponding ends of two axial sections alternately in side to thereby define a serpentine-like structure.

7 Claims, 7 Drawing Sheets 50A    50B

SERPENTINE-SHAPED SPRAG RETAINER OF A SPRAG-SYNCHRONIZED ONE-WAY CLUTCH

BACKGROUND OF THE INVENTION

1. Field of the Invention

This invention generally relates to a one-way clutch assembly, and, in particular, to a sprag-synchronized one-way clutch assembly. More specifically, the present invention relates to a retainer for retaining a plurality of sprags in position in a sprag-synchronized one-way clutch assembly.

2. Description of the Prior Art

A sprag-synchronized one-way clutch assembly is well known in the art. In such a clutch assembly, a plurality of sprags having a predetermined cross sectional shape are arranged in an annular space defined between an inner ring and an outer ring, whereby the sprags are set constrained between the inner and outer rings to prevent a relative rotational motion between the inner and outer rings to thereby allow to transmit a rotational force between the inner and outer rings when the inner ring tends to rotate in a first direction relative to the outer ring; whereas, the sprags are set unconstrained between the inner and outer rings to thereby allow a relative rotational motion between the inner and outer rings when the inner ring tends to rotate in a second direction, which is opposite to the first direction, relative to the outer ring.

FIGS. 12 and 13 illustrate a typical prior art double retainer sprag-synchronized one-way clutch assembly of the above-described type. The illustrated clutch assembly includes a pair of inner and outer sprag retainers for retaining the sprags in position and insuring that the sprags move or rotate in unison during operation. As shown, the one-way clutch assembly shown in FIGS. 12 and 13 includes an inner ring 1 and an outer ring 2 between which an annular space is defined for receiving therein a plurality of sprags 3 having a cross sectional shape similar to a gourd or the figure of "8" as spaced apart from each other. The sprags 3 are maintained in position by a pair of inner and outer sprag retainers 4 and 5 so that the sprags 3 are equally spaced apart from one another circumferentially along the annular space defined between the inner and outer rings 1 and 2. Also provided between the inner and outer sprag retainers 4 and 5 is a ribbon spring 6 which normally urges the sprags 3 to be in contact with the inner and outer rings 1 and 2. In such a double retainer type sprag-synchronized one-way clutch assembly, the sprags 3, the inner sprag retainer 4, the outer sprag retainer 5 and the ribbon spring 6 define an integrated unit so that they would not fall apart even before they are assembled into the annular space between the inner and outer rings 1 and 2.

Drag clips 7 are normally attached to the outer sprag retainer 5 so as to hold the outer sprag retainer in a fixed relation with the outer ring 2 due to the spring action of the drag clips 7. Drag strips 8 are normally provided with its both ends attached to the inner sprag retainer 4, and each of the drag strips 8 has its central portion resiliently pressed against and in sliding contact with the inner ring 1. These drag clips 7 and drag strips 8 serve to positively operate the sprags 3 to thereby secure an engagement between the sprags 3 and each of the inner and outer rings 1 and 2 during transmission of torque between the inner and outer rings 1 and 2 and also to minimize the wear of the sprags 3 during an idle state in which no torque is transmitted between the inner and outer rings 1 and 2.

As described above, a sprag-synchronized one-way clutch assembly typically includes a ring-shaped sprag retainer 50 as shown in FIG. 10. The sprag retainer 50 includes a ring-shaped thin metal plate 51 formed with a plurality of pockets 52, each for retaining therein a corresponding sprag 3, as spaced apart from one another at a predetermined pitch in a circumferential direction. Such pockets 52 are typically formed by punching or blanking and thus the pockets 52 are typically formed one at a time. The sprag retainer 50 is also formed with a flange or raised lip portion 53 at one rim of the ring-shaped plate 51.

In order to provide such a sprag-synchronized one-way clutch assembly light in weight, it has been proposed to use a plastic material for some elements of the clutch assembly. For example, U.S. Pat. No. 4,327,822, issued to Vogele et al. on May 4, 1982, teaches to fabricate a cage 8 from a plastic material, but the cage 8 has a structure which is open at one side as shown in FIG. 6 of that patent. However, if it were tried to fabricate the prior art sprag retainer 50 shown in FIG. 10 from a plastic material, difficulty would be encountered, especially in forming pockets 52 of the sprag retainer 50. In addition, the prior art sprag retainer 50 shown in FIG. 10 hereof can be fabricated only one at a time and it is almost impossible to fabricate the retainer 50 in mass production. If the sprag retainer 50 shown in FIG. 10 were fabricated using a plastic material, there would be formed discontinuous merging points A of flows of plastic material at junctions between circumferential portions and axial portions of the retainer 50 as shown in FIG. 11. These merging points A define local weak spots having reduced rigidity as compared with the remaining portion of the retainer 50. In addition, since the prior art sprag retainer 50 is in the shape of a ring, its flexibility or elastic deformability is limited so that the sprag retainer 50 could be permanently damaged once a concentrated force were applied locally. U.S. Pat. No. 4,494,636, issued to Wakabayashi et al. on Jan. 22, 1985, teaches a serpentine-shaped retainer 9 for use in a one-way clutch as shown in FIGS. 10 and 11; however, the retainer 9 of this patent is fabricated from a rod having a circular cross section by bending the rod alternately and joining the ends together

SUMMARY OF THE INVENTION

In accordance with the present invention, there is provided a sprag-synchronized one-way clutch assembly including a sepertine-shaped sprag retainer fabricated from a plastic material. The sprag retainer of the present invention is serpentine-shaped and thus it includes a plurality of axial sections arranged circumferentially as spaced apart from one another at a predetermined pitch and each having a first end and a second end opposite to the first end, a plurality of first circumferential sections, each connecting the first ends of alternate two adjacent ones of the plurality of axial sections, and a plurality of second circumferential sections, each connecting the second ends of alternate two adjacent one of the plurality of axial sections in a staggered relationship with the plurality of first circumferential sections to thereby define a serpentine-shaped structure. The present sprag retainer is fabricated from a plastic material, and since the retainer has a serpentine-shaped structure, no problem arises even if it is fabricated from a plastic material and no local weak spots are formed.

In the preferred embodiment, each of the plurality of axial sections is comprised of a straight bar having a non-circular cross section, such as a rectangular or square cross section, and extending straight over a predetermined length in an axial direction. And, each of the plurality of first and second circumferential sections, on the other hand, is comprised of an arcuate bar having a non-circular cross section, such as a rectangular or square transverse cross sectional shape.

In a one-way clutch assembly constructed in accordance with one embodiment of the present invention, use may be made of only one such sprag retainer in a double retainer type sprag-synchronized one-way clutch assembly. Or, a pair of such sprag retainers may be used to manufacture a sprag-synchronized one-way clutch assembly. When a pair of sprag retainers is used concentrically, the pair of sprag retainers is preferably set out of phase by one pitch. Alternatively, a pair of such serpentine-shaped sprag retainers may be combined by fitting one on top of another while keeping out of phase by one pitch to define a composite inner or outer sprag retainer.

It is therefore a primary object of the present invention to obviate the disadvantages of the prior art as described above and to provide an improved sprag retainer for use in a sprag-synchronized one-way clutch assembly.

Another object of the present invention is to provide an improved sprag retainer having a serpentine-shaped structure and fabricated from a plastic material or the like.

A further object of the present invention is to provide an improved sprag-synchronized one-way clutch assembly light in weight, sturdy in structure and high in performance.

Other objects, advantages and novel features of the present invention will become apparent from the following detailed description of the invention when considered in conjunction with the accompanying drawings

DESCRIPTION OF THE PREFERRED EMBODIMENTS

Figure 1:
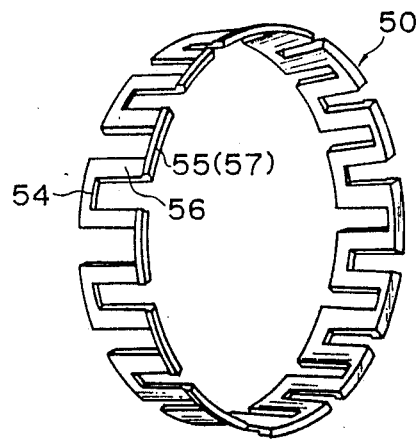
FIG. 1 is a perspective view showing a serpentine-shaped sprag retainer for use in a sprag-synchronized one-way clutch constructed in accordance with one embodiment of the present invention.

Referring now to FIG. 1, there is shown in perspective a serpentine-shaped sprag retainer 50 constructed in accordance with one embodiment of the present invention for use in a double retainer type sprag-synchronized one-way clutch assembly. As shown, the retainer 50 is generally in the shape of a ring and it includes a plurality of axial sections 56 arranged circumferentially and a plurality of circumferential sections 54 and 55, each connecting the ends of two adjacent ones of the plurality of axial sections alternately to thereby define a serpentine-like structure. Described more in detail, each of the axial sections or axially extending sections 56 is comprised of a straight bar having a first end and a second end which is opposite the first end. The plurality of circumferential sections 54 and 55 include a plurality of first circumferential sections or circumferentially extending sections 54, each of which is comprised of an arcuate bar extending circumferentially and connecting the first ends of alternate two adjacent ones of the plurality of axial sections 56. The plurality of circumferential sections also include a plurality of second circumferential sections or circumferentially extending sections 55, each of which is also comprised of an arcuate bar extending circumferentially and connecting the second ends of alternate two adjacent ones of the plurality of axial sections 56 in a staggered relationship with the plurality of first circumferential sections 54.

As a result, as shown in FIG. 1, the present sprag retainer 50 is generally in the shape of a ring and has a serpentine-like structure. A plurality of open pockets are defined in the present sprag retainer 50 because of its serpentine-like structure, and each of the open pockets is defined by two adjacent axial sections 56 and one of the first and second circumferential sections 54 and 55 connecting the corresponding ends of the two adjacent axial sections 56. Thus, the plurality of open pockets are open at one of the two opposite sides alternately. In the preferred embodiment, the axial sections 56 are spaced apart from one another at a predetermined pitch so that a plurality of open pockets, each defined by a pair of adjacent axial sections and a circumferential section connecting the ends of the pair of adjacent axial sections, are defined at a predetermined pitch circumferentially.

The present sprag retainer 50 shown in FIG. 1 is comprised of a plastic material or the like, such as a resin. Because of the peculiar structure of the present sprag retainer 50, a mold for molding the present sprag retainer 50 may be designed to slide in an axial direction and a complicated mold structure having cores for defining pockets, which is required for molding the prior art sprag retainer 50 from a plastic material, is not required. Since use may be made of an axially slidable mold for fabricating the present sprag retainer 50 from a plastic material or the like, more than one of such a sprag retainer may be fabricated at the same time. That is, the present sprag retainer 50 can be manufactured in mass production. Thus, the present sprag retainer 50 and thus a one-way clutch incorporating such a sprag retainer can be manufactured at a low cost.

Figure 2:
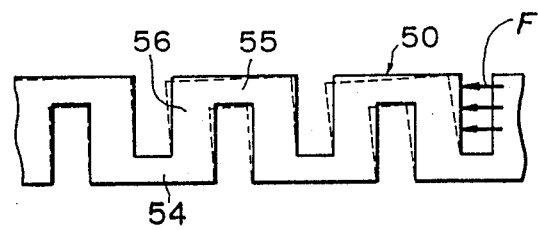
FIG. 2 is an illustration showing how the present sprag retainer absorbs energy when a force F has been applied thereto locally.
Figure 3:
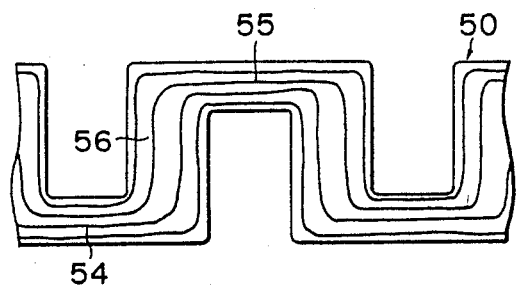
FIG. 3 is an illustration showing the flow of a plastic material when the present sprag retainer is to be fabricated from a plastic material.
Figure 4A:
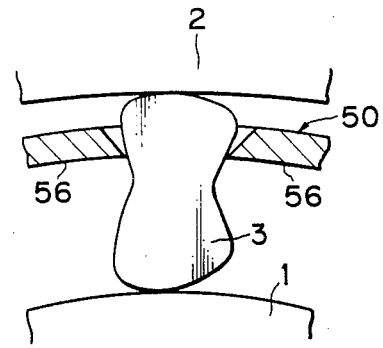
FIGS. 4a through 4d are schematic illustrations showing various examples of contact surfaces of axial sections of the present sprag retainer, against which a corresponding sprag is brought into contact.
Figure 4B:
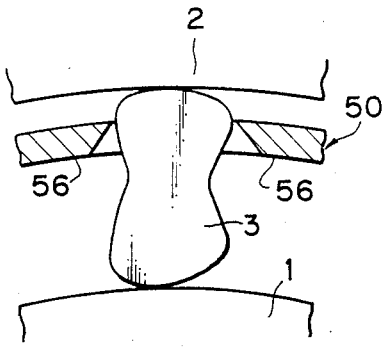
Figure 4C:
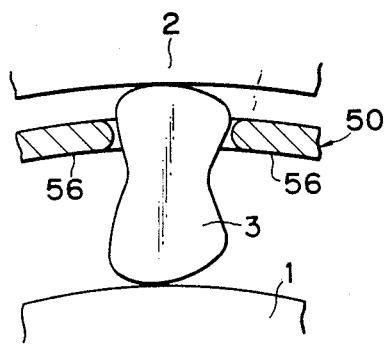
Figure 4D:
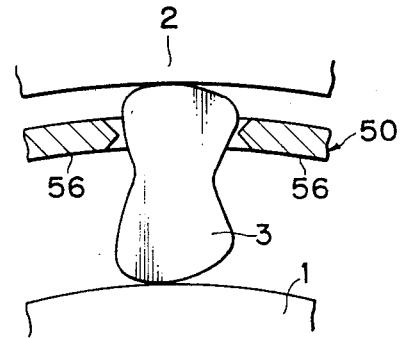
Figure 11:
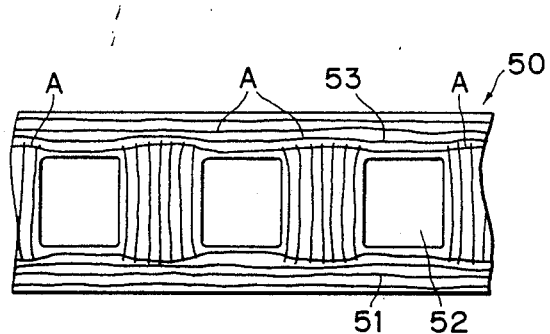
FIG. 11 is an illustration showing the flows of a plastic material when the retainer of FIG. 10 is to be fabricated from a plastic material.

The serpentine-like structure of the present sprag retainer 50 also provides an increased degree of flexibility of elastic deformability. That is, as shown in FIG. 2, when a concentrated force F has been applied locally, the present sprag retainer 50 functions to distribute the energy applied by the force F over its entire structure to thereby prevent a high stress from being created locally. Thus, the present sprag retainer 50 is well prevented from being damaged even if a concentrated force has been applied locally. As shown in FIG. 3, the flow of a plastic material is substantially uniform along the serpentine-like structure of the present sprag retainer 50 during molding and there is no merging point between two flows of a plastic material in different directions as indicated in FIG. 11, so that there is formed no locally weak spot in the resulting structure of the present sprag retainer 50.

Figure 5A:
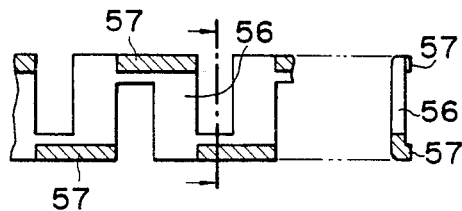
FIGS. 5a through 5f are schematic illustrations showing various examples of flanges which may be provided in the present sprag retainer.
Figure 5B:
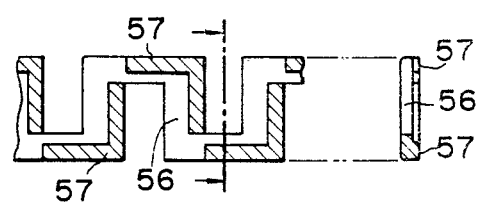
Figure 5C:
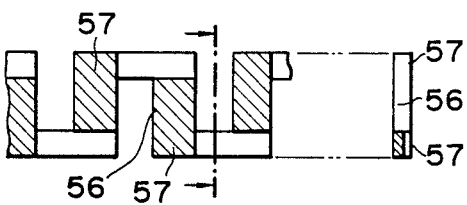
Figure 5D:
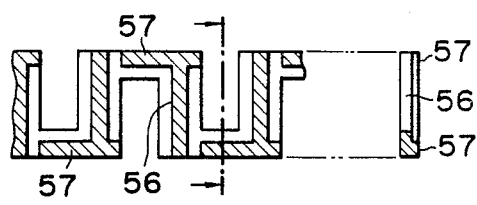
Figure 5E:
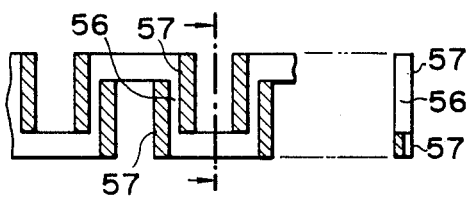
Figure 5F:
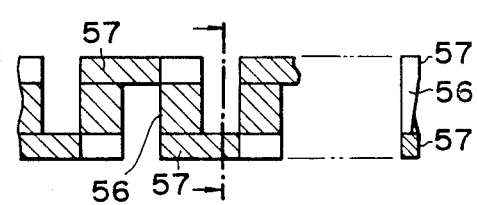
Figure 10:
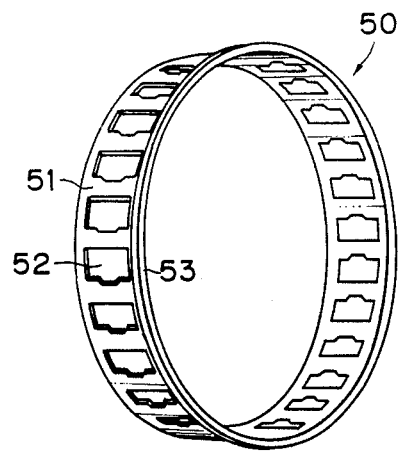
FIG. 10 is a perspective view showing a prior art sprag retainer having a plurality of pockets each of which receives therein a sprag.

In order to form a pocket 52 in accordance with the prior art technique as shown in FIG. 10, it is necessary to use a punching machine or a blanking machine to form a pocket 52 mechanically or to use a core which is pulled out later to form a pocket in a plastic sprag retainer. As a result, in accordance with the prior art technique, the shape of a wall of a pocket, which defines a contact surface to contact a sprag inserted in the pocket, tends to be limited and the resulting contact surface mostly turns out to be radially straight. On the other hand, in accordance with the present invention, since a mold for molding the present sprag retainer 50 may be designed to be slidable in the axial direction, the axial sections 56 of the sprag retainer 50 may have any desired shape as exemplified by FIGS. 4a through 4d. In this manner, in accordance with the present invention, the axial sections 56 of the present sprag retainer 50 may have any desired cross sectional shape and thus the contact surface defined by each of the axial sections 56 to contact a corresponding sprag may take any desired shape or orientation. In addition, when use is made of an axially slidable mold which is slidable with respect to the resulting molded product along the axial direction thereof, the flange 57 to be formed on the present sprag retainer 50 may have any desired shape as exemplified by FIGS. 5a through 5f. Besides, any of the flanges 57 shown in FIGS. 5a and 5f may be formed integrally and at the same time with the rest of the sprag retainer 50.

Figure 6:
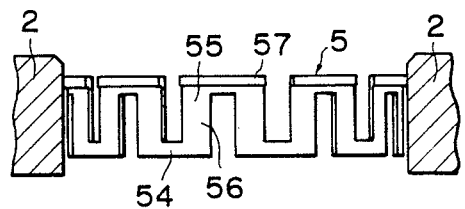
FIG. 6 is an illustration showing the condition in which the flange of the present sprag retainer is in pressure contact with the inner wall of an associated outer ring 2.
Figure 12:
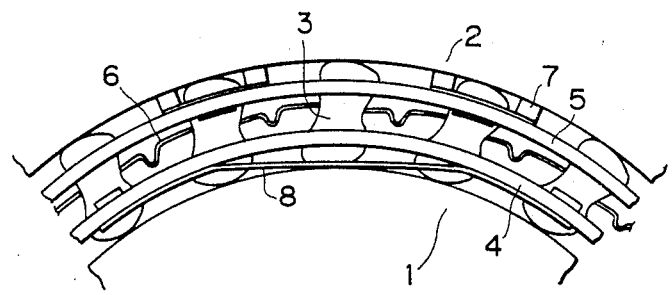
FIG. 12 is a schematic illustration showing a typical prior art double retainer type sprag-synchronized one-way clutch assembly.
Figure 13:
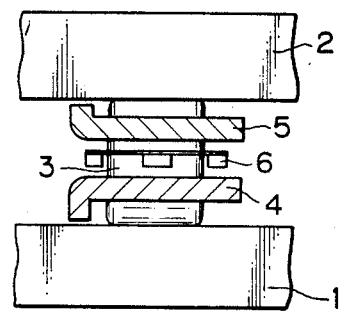
FIG. 13 is a schematic illustration showing a transverse cross sectional structure of the assembly shown in FIG. 12.

FIG. 6 illustrates a double retainer type sprag-synchronized one-way clutch assembly including an outer sprag retainer constructed in accordance with one embodiment of the present invention. In this case, the outermost diameter defined by the outer periphery of the radially extending flange 57 of the outer sprag retainer 5 is designed to be somewhat larger than the inner diameter of the outer ring 2. Thus, when the outer sprag retainer 5 is forcibly fitted into the outer ring 2, the outer sprag retainer 5 is securely held in position within the outer ring 2 due to the springy nature of the outer sprag retainer 5. In the prior art structure shown in FIGS. 12 and 13, the outer sprag retainer 5 is secured to the outer ring 2 by the drag clips 7 and the inner sprag retainer 4 is secured to the outer peripheral surface of the inner ring 1 by the drag strips 8. In another prior art approach where no drag clips 7 are used, the outer sprag retainer 5 is formed with a T-bar section which is slightly bent radially outwardly to contact the inner peripheral surface of the outer ring 2.

In accordance with the present invention, there is no need to use such elements as drag clips and drag strips and to provide a T-bar section as required in the prior art, and it is only necessary to design the outermost diameter defined by the flange 57 of the outer sprag retainer 5 to be somewhat larger than the inner diameter of the outer ring 2 and to push the outer sprag retainer 5 into the outer ring 2. Thus, a required frictional force between the outer sprag retainer 5 and the outer ring 2 can be obtained quite easily. If it is desired to obtain a frictional force between the outer peripheral surface of the inner ring 1 and the inner sprag retainer 4, a similar approach may be taken so that it is only necessary to design the innermost diameter defined by the innermost periphery of the flange of the inner sprag retainer 4 to be somewhat smaller than the diameter of the inner ring 1 and to push the inner sprag retainer 4 onto the inner ring 1.

Figure 7:
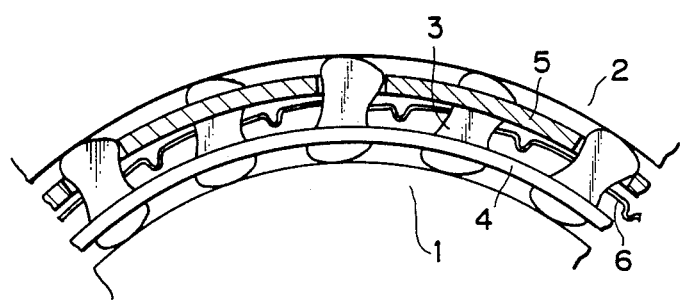
FIG. 7 is a schematic illustration showing a double retainer type sprag-synchronized one-way clutch assembly including one serpentine-shaped sprag retainer constructed in accordance with one embodiment of the present invention.
Figure 8:
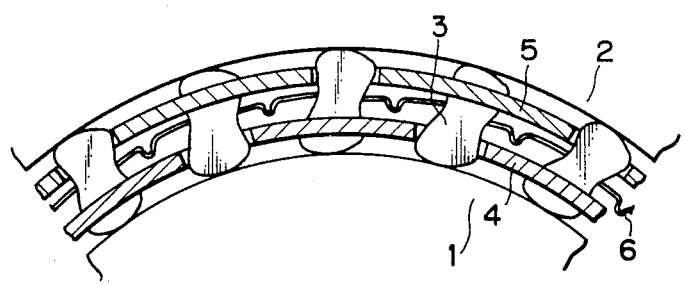
FIG. 8 is a schematic illustration showing a double retainer type sprag-synchronized one-way clutch assembly including a pair of inner and outer serpentine-shaped sprag retainers, which are arranged out of phase by one pitch in the circumferential direction, constructed in accordance with another embodiment of the present invention.

FIG. 7 illustrates a double retainer type sprag-synchronized one-way clutch assembly constructed in accordance with one embodiment of the present invention, including a pair of inner and outer sprag retainers, one of which has a prior art structure with the other having a structure according to the present invention. In the specific embodiment shown in FIG. 7, the outer sprag retainer 5 has a structure according to the present invention. FIG. 8 illustrates a double retainer type sprag-synchronized one-way clutch assembly constructed in accordance with another embodiment of the present invention, including a pair of inner and outer sprag retainers 4 and 5 both of which have a structure according to the present invention. In the clutch assembly shown in FIG. 8, the inner and outer sprag retainers 4 and 5 are shifted in phase in the circumferential direction by one pitch such that the open side of each of the open pockets of the inner sprag retainer 4 corresponds to the closed side of the corresponding open pocket of the outer sprag retainer 5. Such a structure is particularly advantageous because all of the elements, including the sprags, retainers and ribbon spring, are integrated as a unit, so that they will not fall apart even before being assembled into the annular space defined between the inner and outer rings of a one-way clutch assembly.

Figure 9:
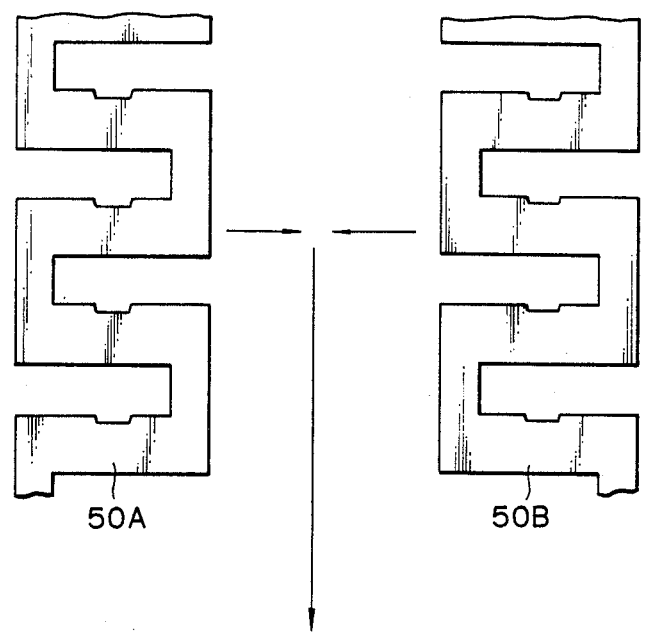
FIG. 9 is a schematic illustration showing how to fabricate a composite sprag retainer by combining two serpentine-shaped sprag retainers.
Figure 9:
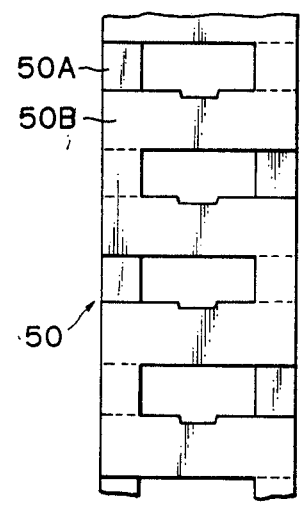

FIG. 9 illustrates an example how a composite sprag retainer is fabricated from a pair of serpentine-like sprag retainers in accordance with a further embodiment of the present invention. In accordance with the present embodiment, a pair of overlying and underlying sprag retainers 50A and 50B is prepared. Each of the overlying and underlying sprag retainers 50A and 50B has a basic structure which is similar in many respects to the serpentine-like structure of the present invention. Thus, each of the overlying and underlying sprag retainers 50A and 50B has a plurality of axial sections arranged circumferentially at a predetermined pitch and a plurality of circumferential sections each connecting the ends of two adjacent axial sections alternately. In the present embodiment, each of the axial sections has a notch formed at one contact surface. These overlying and underlying sprag retainers 50A and 50B are both generally ring-shaped and slightly different in diameter, and, thus, the underlying sprag retainer 50B may be snugly fitted into the overlying sprag retainer 50B to thereby define a composite sprag retainer. In this case, the underlying sprag retainer 50B is shifted in phase in the circumferential direction by one pitch with respect to the overlying sprag retainer 50A so that when these two retainers 50A and 50B are combined to define a composite sprag retainer 50, there are defined a plurality of closed pockets as shown in FIG. 9. Thus, the resulting composite sprag retainer 50 of FIG. 9 is structurally similar in many respects to the prior art ring-shaped sprag retainer shown in FIG. 10.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A one-way clutch assembly, comprising:
   a plurality of sprags having a predetermined shape and arranged circumferentially along an annular space defined between an inner ring and an outer ring; and
   a pair of inner and outer sprag retainers for retaining said plurality of sprags in position in said annular space spaced apart from each other, at least on of said inner and outer sprag retainers being fabricated from a plastic material and including a plurality of axial sections arranged circumferentially at a predetermined pitch and a plurality of circumferential sections each of which connects corresponding ends of two adjacent ones of said plurality of axial sections alternatively on each side to thereby define a serpentine-like cylindrical structure, said at least one retainer further including a flange which is integrally formed with and projecting radially over a predetermined length such that at least one retainer is resiliently held to said inner or outer ring when fitted thereon.

2. The assembly of claim 1, further comprising a ribbon spring interposed between said pair of inner and outer sprag retainers for applying a biasing force to each of said plurality of sprags in a predetermined direction.

3. The assembly of claim 1, wherein said predetermined shape is approximately a figure of number "8."

4. The assembly of claim 1, wherein both of said inner and outer sprag retainers are identical in structure excepting their diameters.

5. The assembly of claim 1 wherein the cross-sectional configuration of said axial sections and said circumferential sections are rectangular.

6. A one-way clutch assembly, comprising:
   a plurality of sprags having a predetermined shape and arranged circumferentially along an annular space defined between an inner ring and an outer ring; and
   a pair of inner and outer sprag retainers for retaining said plurality of sprags in position in said annular space spaced apart from each other, at least on of said inner and outer sprag retainers being fabricated from a plastic material and including a plurality of axial sections arranged circumferentially at a predetermined pitch and a plurality of circumferential sections each of which connects corresponding ends of two adjacent ones of said plurality of axial sections alternatively on each side to thereby define a serpentine-like cylindrical structure, wherein said inner and outer sprag retainers are shifted in phase by one pitch in the circumferential direction.

7. A one-way clutch assembly, comprising:
   a plurality of sprags having a predetermined shape and arranged circumferentially along an annular space defined between an inner ring and an outer ring; and
   a pair of inner and outer sprag retainers for retaining said plurality of sprags in position in said annular space spaced apart form each other, at least on of said inner and outer sprag retainers being fabricated from a plastic material and including a plurality of axial sections arranged circumferentially at a predetermined pitch and a plurality of circumferential sections each of which connects corresponding ends of two adjacent ones of said plurality of axial sections alternatively on each side to thereby define a serpentine-like cylindrical structure, wherein each of said inner and outer retainers is a composite sprag retainer comprised of a pair of overlying and underlying sprag retainers, each of which is fabricated from a plastic material and including a plurality of axial sections arranged circumferentially at a predetermined pitch and a plurality of circumferential sections each of which connects corresponding ends of two adjacent ones of said plurality of axial sections alternatively on each side, which are combined out of phase by one pitch to thereby define a plurality of closed pickets in a circumferential direction for receiving therein said plurality of sprages one for each pocket.

* * * * *